Patented Dec. 1, 1936

2,062,879

UNITED STATES PATENT OFFICE 2,062,879

BUILDING PLATE

Alphonse Hammenecker, Mariekerke, Belgium, assignor to The Ruberoid Co., New York, N. Y., a corporation of New York No Drawing. Application June 22, 1933, Serial No. 677,083. In Belgium June 29, 1932

2 Claims. (Cl. 106—24)

This invention relates to plates for building purposes, and its object is to provide improved plates which, whilst much lighter than similar articles made hitherto of asbestos and cement, are nevertheless as immune as the latter against fire, rot, and damage from insects, may be worked as readily as wood, and are adapted for use as insulation against sound and heat.

The improved building plates according to my invention consist essentially of a mixture of asbestos fibre and a mineral binding agent. Their composition distinguishes over that of the well known cement-asbestos plates, chiefly by the presence of a high proportion of lime and of a material adapted to fix such lime. In the preferred embodiment of the invention, the material for fixing the lime, i. e., for combining with and retaining the lime, consists essentially of active silica. Active silica, which may be a natural product or an industrial product, offers the advantage of having a very low specific weight and also of combining with lime at atmospheric temperature to form calcium silicate which has very good fibre coating properties and confers to the plate a considerable strength relatively to its weight.

The lime may be introduced as such, or in the form of materials which contain it in the free state, for example in the form of cement waste which has stood for a length of time under water, the other components of this product then acting as inert filler. In some cases, a certain amount of wood fibre or other organic fibres may be added to the mixture.

By way of example, suitable compositions of mixtures adapted for the production of plates or slabs according to my present invention, are as follows:

|  (I) | Per cent |
|---|---|
| Asbestos fibre | 25 |
| Lime | 30–40 |
| Active silica | 30–40 |

|  (II) | Per cent |
|---|---|
| Asbestos fibre | 15 to 25 |
| Lime | 25 |
| Active silica | 17 to 27 |
| Inert filler | 33 |

|  (III) | Per cent |
|---|---|
| Asbestos fibre | 25 |
| Cement waste | 35 to 40 |
| Active silica | 35 to 40 |

The plates according to my invention may conveniently be manufactured in the same manner as fibro-cement plates, i. e. by means of a cardboard making machine.

When used without further treatment, the plates thus produced provide excellent insulation against sound and heat since, owing to their low apparent density (about 0.5) which is only about 30 to 60% of that of the usual fibro-cement plates, they may be made relatively thick without being unduly heavy.

If desired the plates may be compacted under pressure in which case they constitute a material possessing properties similar to those of wood and adapted, despite its essentially mineral nature, to be sawn, carved, polished, nailed or worked in any other manner.

I claim:

1. A building plate comprising about 25% asbestos fibre and about 30 to 40%, each, of lime and of active silica.

2. A building plate containing about 15% to 25% of asbestos fibre, the remainder comprising lime and active silica in substantially equal proportions.

ALPHONSE HAMMENECKER.